Figure 1:
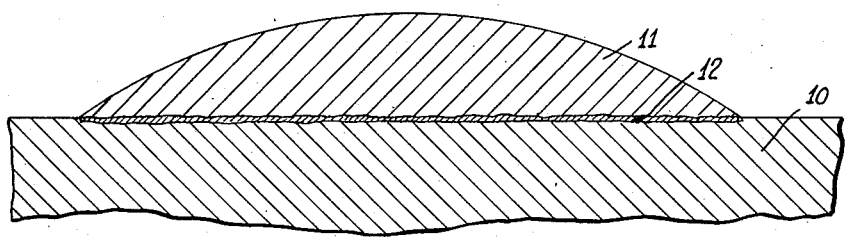

Jan. 22, 1952     R. D. WASSERMAN     2,583,163
ALLOYING PROCESS IN BONDING OF METALS
Filed May 6, 1944

INVENTOR.
RENE D. WASSERMAN.
BY
ATTORNEY.

Patented Jan. 22, 1952

2,583,163

UNITED STATES PATENT OFFICE 2,583,163

ALLOYING PROCESS IN BONDING OF METALS

Rene D. Wasserman, New York, N. Y.

Application May 6, 1944, Serial No. 534,463

1 Claim. (Cl. 117—71)

This invention relates to an improved welding, brazing or soldering method adapted for application to ferrous and non-ferrous base metals.

It is a well known phenomenon that the quality of welding, brazing and similar bonding operations depends primarily on the avoidance of oxides on the heated parent or base metal.

It has been further observed that certain alloys used as filler, welding or brazing rods seem to adhere faster and better than others to the base or parent metal.

It is, therefore, one of the main objects of this invention to provide means for perfecting and speeding welding and other bonding operations at lower temperatures than heretofore used and for obtaining bonds of greater strength and with uniform alloying effect, thereby avoiding formation of oxides or other disadvantageous influences on the bond.

It is another object of this invention to provide means for allowing the application of welding, brazing and soldering operations in new fields of the industry where such operations have been heretofore unsuccessfully tried.

It is a further object of the present invention to provide means for improving welding and other bonding operations, which take into consideration particular alloys or compound materials having an unusual high degree of affinity to the base metal with which they will in their liquified state bind and alloy at great speed.

It is still another object of this invention to provide means adapted to create at the boundary between the parent or base metal and the liquified welding, brazing or soldering material a new alloy in form of a layer or stratum of very small thickness, thereby achieving a true alloyed weld.

Still a further object of this invention resides in the provision of predetermined ingredients in welding, brazing or soldering material, which ingredients upon contact with the parent metal produce interlocking crystals between those of the parent metal and of the newly formed alloy, thereby causing a bond between the parent metal and welding rod material at greater speed, lower temperature, lower cost and of greater strength than heretofore experienced.

Yet, another object of this invention is the provision of means forming a seal and protection against oxidation of the parent metal and disintegration due to unnecessary heat application.

Still another object of the present invention is to provide a new bonding method, in which a "boundary" alloy is brought about, made up substantially more by the filler or rod material than by the parent metal and having a lower melting point than said parent metal.

A still further object of this invention is the provision of means to effectively avoid warping, stresses and distortion of the parent metal during application of the new bonding method, which may be achieved with less heat or gas and at a minimum of time.

These and other objects of the invention may be realized from the ensuing description which discloses some examples incorporating the invention.

In order to carry this invention into effect, reference is herewith made to the accompanying drawing, in which Fig. 1 is a sectional view of a weld assembly consisting of a base metal with a weld metal or alloy applied thereto in accordance with the invention.

Figure 2:
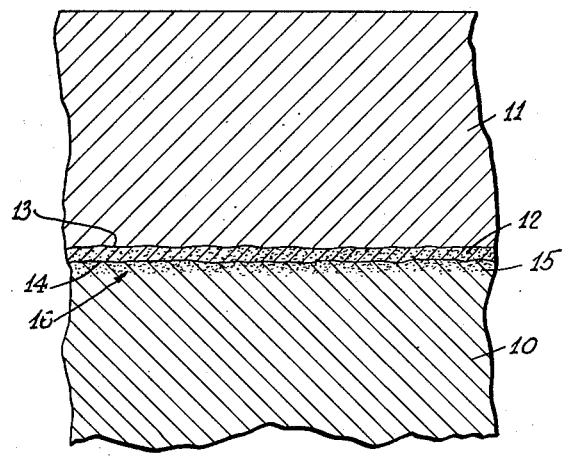

Fig. 2 is a view of a section of the assembly of Fig. 1 shown on enlarged scale.

As may be realized from Fig. 1, base metal 10 is overlaid or surfaced by a seam of weld metal 11, at least one of the ingredients of the latter possessing an unusual high degree of affinity to the base metal. It will be observed that at the juncture of the base metal and the weld metal a "boundary" alloy or stratum 12 is caused to be formed which includes proportionately said ingredient or ingredients and component or components of the base metal and is further characterized by a reduced thickness (sometimes less than one thousandth ($1/1000$) of an inch) and by a cast-like dendritic structural formation.

Fig. 2 illustrates on enlarged scale "boundary" alloy 12 extending lengthwise of the base metal 10 and having upper and lower limits 13—14. The transition between stratum 12 and weld metal layer 11 is rather abrupt as observed upon metallographic examination, whereas zone 15 of the base metal neighbouring said stratum is interspersed with the aforementioned ingredient or ingredients showing upon microscopic examination considerable intergranular penetration between the weld metal and base metal, as indicated by numeral 16.

It will be noted that bonds between weld metal and base metal thus attained show greater strength with perfect alloying effect than heretofore experienced. The welding or brazing operation may be performed at great speed and at lower temperatures and such operation may be applied to different types of base metals and in new fields of the industry where success previously met unusual difficulties.

In the course of various tests, it has been found that when certain metals or components are present in alloys to be employed as welding, brazing or soldering alloys and upon liquification thereof by means of an oxy-acetylene flame, they will not only adhere to the preheated parent or base metal but form a new alloy at the junction or boundary between the liquid alloy and the solid parent metal which may be preheated far below its fusion point. This so-called "boundary" alloy insures a real weld, is of crystalline form, is free of any or excessive impurities and the crystals of the newly formed alloy interlock with the crystals of the parent metal.

The welding alloy containing entirely or partially predetermined metals or components of such metals, which should be carefully chosen, permits the obtainment of bonds of considerable strength and at relatively low cost which, due to the formation of an apparently eutectic "boundary" alloy, forms a seal against oxidation of the parent or base metal and protects weld and base metal against disintegration through excessive heat application. Joints produced according to the invention are extremely clean and require a minimum amount of finishing.

The new boundary alloy has generally a lower melting point than the parent metal and is therefore more receptive of the filler or weld metal than the parent metal, the application of the weld metal to said boundary alloy or stratum taking place under less heat and lower gas consumption.

The temperature at which the liquid alloy may "attack" the parent metal may be indicated by the melting of a flux designed for each rod of weld metal. The fluxes act very much in the manner of a catalyst and cause reduction of surface tension, prevention of oxidation and aid in floating to the surface impurities of the alloy newly formed. The reaction thus occurring between the weld material and the base metal during the operation produces said eutectic "boundary" alloy immediately and below the surface of the base metal. Because of this alloying effect, this process is definitely "welding" although the alloys may be applied far below the fusion temperature of the base metals.

The new process may be well illustrated by a simple experiment. A sheet of copper is coated with an appropriate flux for an aluminum "low temperature" welding rod. The copper plate is preheated and when the melting flux indicates that the flow point of the rod is reached, the forward end of the rod is forced straight down onto the surface of the copper plate. If the copper plate is held at this temperature for just a few seconds, the aluminum alloy rod will cause a sharp perforation right through the copper plate. Adjacent the perforation a eutectic alloy of copper and aluminum is formed which has a melting point some 700° F. below the melting point of copper. This alloy being completely molten at this temperature has allowed the aluminum rod to be passed through the copper plate at that point, without bringing about any metallurgical change in the base metal proper.

The following examples made during research and tests demonstrate the formation of new, completely or partially eutectic, boundary alloys attained.

1. A base metal of substantially pure aluminum of 1" x 2" and ½" thick was overlaid by a zinc-tin solder. Sufficient amount of tin was present to assure the alloy to flow freely. Adherence was poor at the beginning until the base metal was heated for sufficient period of time, at which the zinc of the solder forms an alloy with the surface of the aluminum base. The depth of penetration of zinc into the base increases rapidly since the amount of zinc in the zinc-tin solder decreased accordingly, zinc being readily absorbed by the aluminum base. The zinc-tin solder can much easier be applied and adheres better than ordinary tin-lead or ordinary tin alloys which show no affinity to and do not readily form an alloy with aluminum. The base metal of aluminum clearly shows a stratum or zone which is enriched by zinc due to the penetration of zinc, whereas the layer above said stratum contained only a fraction of the zinc previously included in the solder.

2. A copper-zinc base plate about $\frac{1}{8}$" thick, having a melting point of about 1700° to 1800° F. and comprising 40% to 60% by weight of copper, was preheated to approximately 1100° F. An appropriate flux was applied to the base surface prior to its preheating. At approximately 1100° F. an aluminum alloy containing approximately 10% to 15% by weight of silicon was melted down on said preheated base and it was noticed that a drop of said aluminum-silicon alloy turned dark very rapidly, particularly where it came in direct contact with the surface of the base. By exerting a slight pressure on the base by means of the aluminum-silicon rod, this alloying effect can be speeded up considerably and the base surface will disintegrate and a large hole was left at the location where said pressure occurred. The entire operation was performed at 1100° F. which is far below the melting point of the base metal. A large amount of silicon from the aluminum-silicon alloy formed a new copper-silicon alloy on the surface of the base, and a considerable amount of the aluminum has alloyed itself with the zinc constituent of the base metal. These new alloys have a much lower melting point than the brass of the base. It was therefore relatively easy to break the new molten alloys under slight pressure exerted by means of the welding rod.

3. A base metal in form of a copper sheet was welded by means of a rod containing about 90% to 95% by weight of copper and 5% to 10% by weight of phosphorus. A formation of a phosphorus-copper eutectic alloy was brought about immediately on the surface of the copper sheet. It was impossible to remove the stratum of this eutectic alloy although extremely thin, the great affinity of phosphorus to copper being noticeable because it was difficult to control the flow of the deposited welding alloy. The affinity of phosphorus to copper is so considerable that the oxides on copper were broken up and no flux was necessary to bring about the alloying effect.

4. A wrought iron slug of 1" x 2" and ½" thick was heated up to about 1800° F. by means of an oxy-acetylene with or without application of flux. The flame was regulated to provide an excess of acetylene whereby the carbon supply could be increased. A steel welding rod containing a somewhat higher amount of carbon than usual was employed as a filler metal having a melting point of over 2000° F. However, it has been found that this steel alloy need only be heated to a temperature of 2000° F. to form a eutectic alloy at the surface of the steel containing approximately 4.3% of carbon. The alloy thus brought about has a lower melting point than the base and a lower melting point than the filler rod itself. The carbon content being increased by the excess of carbon from the welding flame was enhanced at the surface of the base and a glossy and easily visible new alloy was formed immediately on the base surface to which alloy the steel filler rod adhered firmly. Microscopical examination has shown that a complete bond was achieved, although the wrought iron base has not been heated up to its fusion point, the heating temperature being only between 1742° F. and 2282° F.

It is well apparent from the aforesaid disclosure that according to this invention the base metal surface may be so prepared that the same takes in or absorbs one or more ingredients externally supplied thereto and having a high degree of affinity to the base metal whereby an alloy stratum is attained which readily and strongly bonds itself to the base metal and has simultaneously the property of permitting adherence of the weld or bond metal with said alloy stratum. The ingredient or ingredients heretofore referred to may be either contained in the weld or bonding metal or may be separately supplied, such as by means of the welding flame. It may be further possible to apply successively several weld metals having different properties and melting points to the base metal to thereby bring about a strong bond consisting of layers the sequence of which is that the lowermost layer forms a boundary alloy with the base metal because it has the strongest affinity to the base metal while the remaining layers bond themselves readily to the said lowermost layer and the following layers, respectively.

It is always to be kept in mind that in such cases the lowermost layer will have a lower melting point than the melting point of the base metal and any of the successive layers.

Many modifications of and various embodiments and applications of the invention are possible and may be evident to those skilled in the art without departing from the spirit and scope of this invention. The disclosure and description relating to this application are purely illustrative and in no way limitative.

Having thus described the invention what is claimed as new and desired to be secured by Letters Patent, is:

A welding or like bonding process in which a base metal is to be surfaced with a weld metal which process consists in supplying first a relatively thin layer of a bonding metal to the surface of said base metal and allowing under application of heat below the melting point of the base metal at least one ingredient of said bonding metal to alloy itself with at least one constituent of said base metal to which said ingredient has a high degree of affinity, providing thereby an intermediate alloy stratum having a melting point below the melting point of said base metal and that of said bonding metal, then melting onto said alloy stratum a weld metal to thereby bond said weld metal to said base metal with said alloy stratum positioned therebetween, and thereafter applying to the layer of weld metal another layer of a different weld metal having a higher melting point.

RENE D. WASSERMAN.

REFERENCES CITED

The following references are of record in the file of this patent:

UNITED STATES PATENTS

| Number | Name | Date |
|---|---|---|
| 549,610 | Ramage | Nov. 12, 1895 |
| 1,233,803 | Overend | July 17, 1917 |
| 1,619,852 | Conti | Mar. 8, 1927 |
| 1,651,709 | Jones | Dec. 6, 1927 |
| 1,875,911 | Andrews | Sept. 6, 1932 |
| 1,939,467 | Short et al. | Dec. 12, 1933 |
| 1,996,657 | Shannon | Apr. 2, 1935 |
| 2,043,952 | Ffield | June 9, 1936 |
| 2,055,360 | Ogden | Sept. 22, 1936 |
| 2,075,810 | George | Apr. 6, 1937 |
| 2,137,097 | Sateren | Nov. 15, 1938 |
| 2,147,367 | George | Feb. 14, 1939 |
| 2,190,267 | Light | Feb. 13, 1940 |
| 2,200,742 | Hardy | May 14, 1940 |
| 2,232,176 | Guthrie | Feb. 18, 1941 |
| 2,241,563 | Wall | May 13, 1941 |
| 2,310,568 | Atlee et al. | Feb. 9, 1943 |
| 2,313,315 | Blais | Mar. 9, 1943 |
| 2,330,062 | Lempert | Sept. 21, 1943 |

FOREIGN PATENTS

| Number | Country | Date |
|---|---|---|
| 13,689 | Great Britain | 1907 |
| 539,337 | Great Britain | Sept. 5, 1941 |

OTHER REFERENCES

"Eutectic Low Temp. Welding Process," pp. 2, 6, 7, 9, 10, 11, 14, 16, 17 and 25. Pub. Eutectic Welding Alloys Co., N. Y. Copyright 1942. Division 14.

"The Welding Encyclopedia," 8th ed., 1932, p. 44, Col. 1. Pub. the Weld. Eng. Pub. Co., Chicago, Ill. Div. 14.